United States Patent Office 3,342,851
Patented Sept. 19, 1967

3,342,851
ESTERS OF [(2 - METHYLENEACYL)PHENOXY]-CARBOXYLIC ACIDS AND A METHOD FOR THEIR PREPARATION
Everett M. Schultz, Ambler, and James M. Sprague, Gwynedd Valley, Pa., assignors to Merck & Co., Inc., Rahway, N.J., a corporation of New Jersey
No Drawing. Filed Oct. 30, 1964, Ser. No. 407,912
12 Claims. (Cl. 260—473)

This invention relates to a new group of pharmacologically active carboxylic acid esters.

In our copending application Serial No. 155,961, filed December 6, 1961, there is disclosed a new class of diuretics which are described as [(2-methyleneacyl)phenoxy] substituted carboxylic acids. It is an object of this invention to describe various ester derivatives of the foregoing acids which are also useful as diuretics and which can be used to eliminate excess fluid and electrolytes from the body. Thus, when administered in therapeutic dosages in conventional vehicles the [(2-methyleneacyl)phenoxy]-carboxylic acid esters of the invention may be used in the treatment of hypertension, congestive heart failure, kidney malfunctioning, cirrhosis of the liver and other diseases associated with edema, so as to effectively reduce the concontration of sodium and chloride ions in the body and lower dangerous excesses of body fluids to acceptable levels.

The [(2-methyleneacyl)phenoxy-carboxylic acid esters of the invention are compounds having the following structural formula:

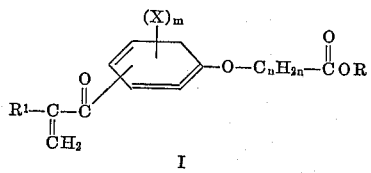

I wherein R is a member selected from the group consisting of mononuclear aryl-carbonyl-methyl, for example, a phenacyl radical wherein the benzene nucleus may be substituted by halogen or lower alkyl, and mononuclear aryl, e.g., phenyl, 4-tolyl, 2,3-xylyl, 4-ethylphenyl, etc., $R^1$ is a member selected from the group consisting of lower alkyl, e.g., methyl, ethyl, propyl, isopropyl, butyl, pentyl, etc., and trifluoromethyl substituted lower alkyl, e.g., 2,2,2-trifluoroethyl, 2,2,2-trifluoroisopropyl, etc.; X is a member selected from the group consisting of hydrogen, halogen, e.g., chlorine, bromine, fluorine, etc., and lower alkyl e.g., methyl, ethyl, etc.; $m$ is an integer having a value of 1-4; and $n$ is an integer having a value of 1-4.

A preferred embodiment of the invention relates to the [4-(2-methylenealkanoyl)phenoxy]-alkonoic acid esters of the following formula:

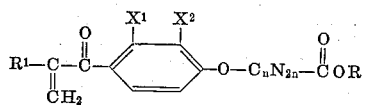

wherein R, $R^1$ and $n$ are as defined above; $X^1$ is halogen and $X^2$ is a member selected from the group consisting of hydrogen and halogen. The above class of compounds exhibits particularly good diuretic activity and represents a preferred subgroup of compounds within the scope of this invention.

The [(2-methylenealkanoyl)phenoxy] - alkanoic acid esters of the invention are prepared by the reaction of a [(2-methylenealkonyl)phenoxy]-alkanoic acid halide with an appropriate alcohol as, for example, with a di-lower alkylamino substituted alkonol, with phenol, an alkyl substituted phenol such as 4-ethylphenol, a cresol such as 4-methylphenol, or with a xylenol, e.g., 2,3-xylenol, etc. The reaction may be conducted in the presence of any solvent which is reasonably inert with respect to the reactants employed as, for example, in the presence of ether or, when a phenol reactant is used, in the presence of pyridine. When the alcohol employed is a di-lower alkyl-amino-alkanol it is advantageous to conduct the reaction in the presence of a basic reagent such as potassium carbonate followed by treatment of the resulting product in such a manner as to separate an acid addition salt of the [(di-lower alkylaminoalkyl)alkanoylphenoxy] - alkanoic acid as, for example, by treatment with hydrogen chloride.

The mononucleard aryl-carbonyl-methyl [(2-methylenealkanoyl)-phenoxy]-alkanoates (Ia, infra) of the invention are prepared by the reaction of a suitable phenacyl halide with an appropriate [(2-methylenealkanoyl)phenoxy]-alkanoic acid. The following equation illustrates this method of preparation:

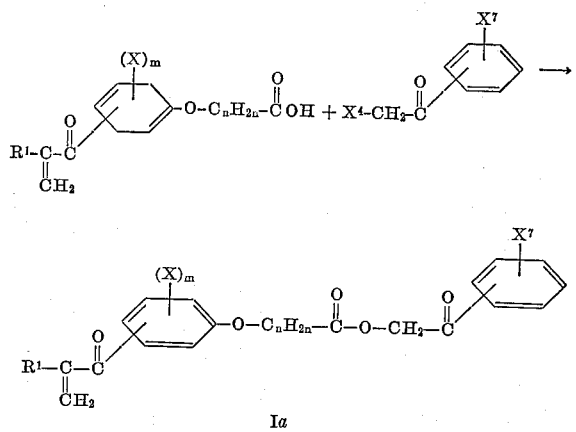

Ia wherein $R^1$, X, $m$ and $n$ are as defined above, $X^7$ is a member selected from the group consisting of hydrogen, halogen and lower alkyl and $X^4$ is halogen, for example, bromine, chlorine, iodine, etc.

The [(2-methylenealkanoyl)phenoxy] - alkanoic acid halides which are employed as reactants in the process, are prepared by a series of steps beginning with the reaction of an alkanoylphenoxy-alkanoic acid (IV) with formaldehyde or paraformaldehyde and the acid addition salt of a secondary amine as, for example, the acid addition salt of a di-lower alkylamine, piperidine or morpholine; the Mannich amine salt (V) thus formed may then be converted directly to the corresponding [(2-methylenealkanoyl)phenoxy]alkanoic acid (III) by decomposition as, for example, by heating the said Mannich salt at temperatures above room temperature in the presence of a solvent of high dielectric constant, e.g., dimethylformamide, or the Mannich amine salt (V) may be treated with a weak base, such as sodium bicarbonate, to obtain the corresponding free Mannich base (VI), which then eliminates a secondary-amino group to form the [(2-methylenealkanoyl)phenoxy]-alkanoic acid (III). In some instances elimination of the secondary-amino group to form the [(2-methylenealkanoyl)phenoxy]-alkanoic acid (III) occurs at ambient temperatures but, generally, elimination is most advantageously effected by the application of heat. Alternatively, the [(2 - methylenealkanoyl) - phenoxy]-alkanoic acid compound (III) may also be prepared by treating the Mannich amine derivative (VI) with a suitable quaternizing agent as, for example, with an alkyl halide, to produce the corresponding quaternary ammonium salt (VII) and the quaternary ammonium derivative thus produced may be treated with a base, for example, with an aqueous solution of sodium bicarbonate, and then with an acid, such as hydrochloric acid, to produce the [(2-methylenalkanoyl)-phenoxy]-alkanoic acid compound (III). The [(2-methylenealkanoyl)phenoxy]-alkanoic acid produced by the foregoing processes is then treated with an halogenating agent such as thionyl chloride to produce the desired [(2-methylenealkanoyl)phenoxy]-alkanoic acid halide (II). The following equations illustrates these reactions:

wherein $R^1$, X, m and n are as defined above, $X^5$ represents halogen, for example, chlorine, bromine, etc. and $MX^2$ represents a metallic halide.

However, the 2-alkonylphenoxy-alkanoic acid and 3-alkanoylphenoxy-alkanoic acid starting materials in the foregoing reaction are prepared in a manner which is distinct from that recited above for preparing the 4-alkanoyl substituted phenoxy-alkanoic acid derivatives (IV).

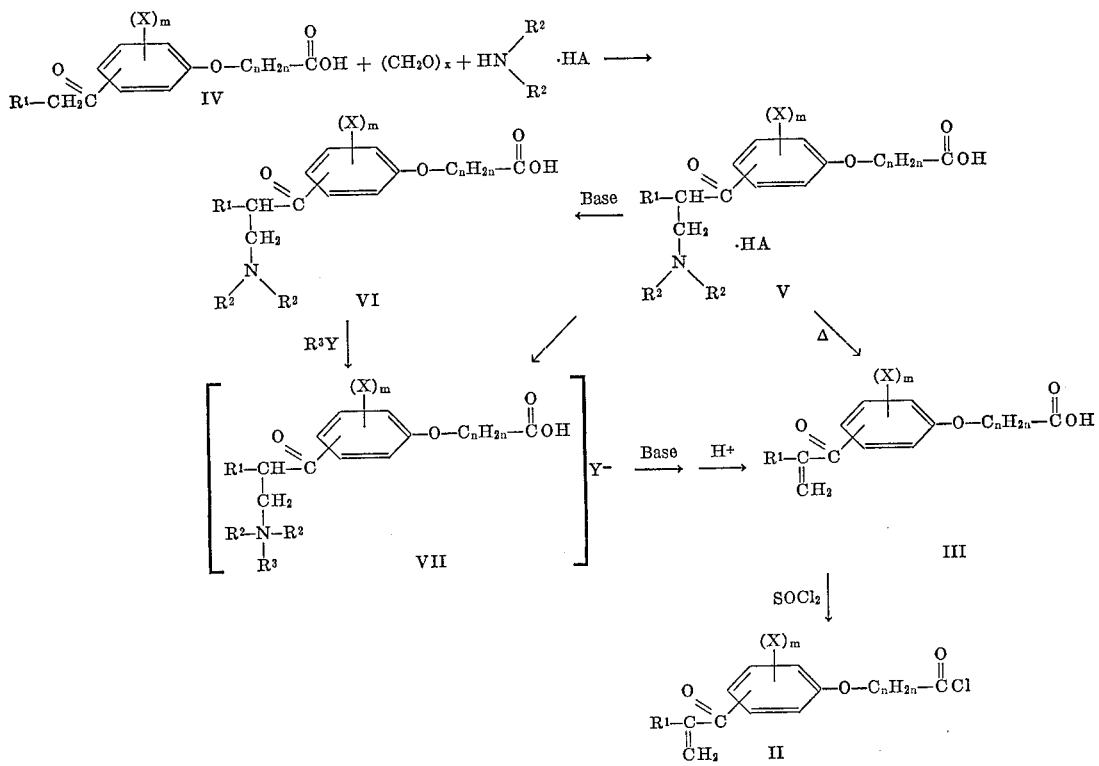

wherein $R^1$, X, m and n are as defined above

represents a secondary amine, for example, an amine selected from the group consisting of di-lower alkylamine, piperidine, morpholine, etc.; HA is the acidic moiety derived from an organic or inorganic acid capable of forming salts with amines, for example, hydrochloric acid, etc.; $R^3Y$ represents an hydrocarbyl halide, i.e., the halide derivative of a monovalent organic radical composed solely of carbon and hydrogen such as methyl bromide, methyl iodide, etc.; and x is the integer 1 or a number greater than 1.

The 4-alkanoylphenoxy-alkanoic acids (IV), which are employed as starting materials in the foregoing synthesis, are conveniently prepared by treating an alkanoyl halide (VIII, infra) with an appropriate phenoxy-alkanoic acid (IX, infra) in the presence of a metallic halide. Metallic halides which are suitable in the process include, for example, anhydrous aluminum chloride and boron trifluoride. The following equation illustrates the reaction:

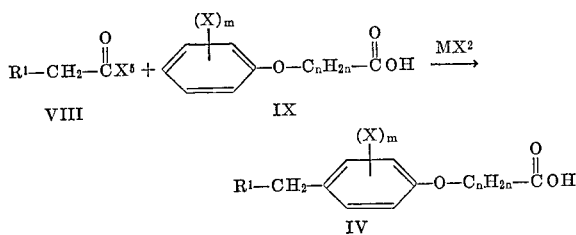

According to this method a 2-alkonyl- or 3-alkanoyl substituted phenol (X, infra) is alkylated by the reaction of an halo substituted alkanoic acid, such as an haloacetic acid, or with a lower alkyl ester thereof, such as ethyl bromoacetate, to produce the corresponding 2-alkanoyl- or 3-alkanoyl substituted phenoxy-alkanoic acid or the lower alkyl ester thereof and, when the ester is formed, hydrolyzing the ester derivative thus produced to the desired acid by treatment with an aqueous solution of a base. The following equation, wherein the phenol employed is a 3-alkanoylphenol and the alkylating agent is an halo substituted alkanoic acid ester, illustrates the reaction; however, the reaction is illustrative only and it is to be understood that a 2-alkanoyl-phenol may be employed in a similar manner to obtain the corresponding 2-alkanoylphenoxy-alkanoic acid derivative:

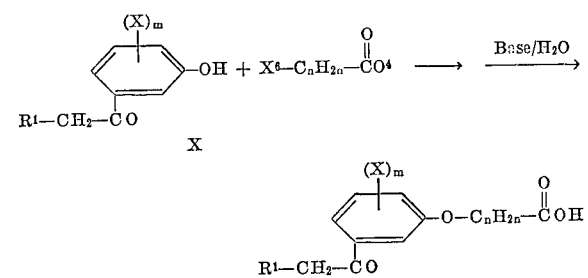

wherein $R^1$, X, m and n are as defined above; $X^6$ represents halogen, for example, chlorine, bromine, etc.; and $R^4$ represents a lower alkyl radical, for example, methyl, ethyl, etc.

The [(2-methylenealkanoyl)phenoxy]-alkanoic acid esters of the invention are generally obtained as crystalline solids and, if desired, may be purified by recrystallization from a solvent. Suitable solvents include, for example, ethanol, isopropyl alcohol, acetone, etc.

The products of the invention are diuretic and saluretic agents and can be administered in therapeutic dosages in conventional vehicles as, for example, by oral administration in the form of a tablet as well as by intravenous injection. Also, the dosage of the products may be varied over a wide range as, for example, in the form of scored tablets containing 25, 50, 100, 150, 250 and 500 milligrams of the active ingredient for the symptomatic adjustment of the dosage to the patient to be treated. These dosages are well below the toxic or lethal dose of the products.

The examples which follow illustrate the [2-methylenealkanoyl)phenoxy]-alkanoic acid esters of the invention and the method by which they are prepared. However, the examples are illustrative only and it will be apparent to one having ordinary skill in the art that all of the products embraced by Formula I, supra, may also be prepared in an analogous manner by substituting the appropriate starting materials for those set forth in the examples.

EXAMPLE 1

2-dimethylaminoethyl [3-chloro-4-(2-methylene butyryl)phenoxy]acetate hydrochloride Step A: (3 - chloro - 4-butyrylphenoxy)acetic acid.—Powdered aluminum chloride 217 g., 1.625 mole) and carbon disulfide (400 ml.) are placed in a 1-liter, 4-necked flask equipped with a stirrer, dropping funnel, reflux condenser and internal thermometer. (3-chlorophenoxy)actic acid (93.3 g., 0.5 mole) is added in portions with stirring and then n-butyryl chloride (66.6 g., 0.625 mole) is added dropwise with stirring over a period of 0.5 hour at a temperature of about 22–26° C. After stirring one hour at room tempearture, the reaction flask is placed in a water bath and the temperature maintained at 50° C. for three hours. The carbon disulfide then is decanted and the gummy reaction product obtained is added to a mixture of ice (1 kg.) and concentrated hydrochloric acid (100 ml.). A solid separates and is dissolved in saturated sodium bicarbonate solution (1.5 liters). The solution is filtered, and the clear, yellow filtrate obtained is acidified with hydrochloric acid. The yellow oil that separates solidifies slowly to give a solid melting at 76–85° C. After recrystallization from benzene, there is obtained 66.7 g., 51%, of (3-chloro-4-butyrylphenoxy)-acetic acid, M.P. 89–90° C.

Analysis for $C_{12}H_{13}ClO_4$—Calculated: C, 56.15; H, 5.10; Cl, 13.81. Found: C, 56.24; H, 5.43; Cl, 13.57.

Step B: [3 - chloro - 4-[2-(dimethylaminomethyl)-butyryl]phenoxy]acetic acid hydrochloride.—In a 100 ml. round flask equipped with an outlet tube suitable for application of intermittent suction, an intimate mixture of (3-chloro-4-butyrylphenoxy)-acetic acid (5.12 g., 0.02 mole), paraformaldehyde (0.7 g., 0.022 mole), dry dimethylamine hydrochloride (1.78 g., 0.02 mole) and acetic acid (4 drops) is heated on the steam bath for about 1.5 hours during which period suction is applied for about one-minute intervals five or six times. Upon cooling, a solid is obtained which, after triturating with acetone, gives the product in the form of a white solid. Upon recrystallization from acetonitrile, and from isopropyl alcohol, there is obtained [3-chloro-4-[2-(dimethylaminomethyl)butyryl]phenoxy]acetic acid hydrochloride, M.P. 127–129° C.

Analysis for $C_{15}H_{20}ClNO_4 \cdot HCl$—Calculated: C, 51.42; H, 6.04; Cl, 20.25. Found: C, 51.32; H, 5.90; Cl, 20.19.

Step C: [3 - chloro-4-(2-methylenebutyryl)-phenoxy] acetic acid.—[3 - chloro - 4-[2-(dimethylaminomethyl) butyryl]-phenoxy]acetic acid hydrochloride, obtained as described in Step B, is dissolved in 25 ml. of water and the solution made slightly basic by the addition of 10% sodium bicarbonate solution. The resulting solution is heated for about 25 minutes on a steam bath, cooled and acidified with 6 N hydrochloric acid to give a 69% yield of crude product, M.P. 108–109.5° C. After recrystallization from a mixture of cyclohexane and benzene there is obtained [3 - chloro-4-(2-methylenebutyryl)phenoxy] acetic acid, in the form of colorless crystals, M.P. 109–111° C.

Analysis for $C_{13}H_{13}ClO_4$—Calculated: C, 58.11; H, 4.88; Cl, 13.20. Found: C, 57.87; H, 5.05; Cl, 13.02.

Step D: 2-dimethylaminoethyl [3-chloro-4-(2-methylenebutyryl)phenoxy]acetate hydrochloride.—[3-chloro-4-(2-methylenebutyryl)phenoxy]acetic acid (20 g., 0.0745 mole) is dissolved in warm dry benzene (75 ml.). The mixture is heated to boiling and purified thionyl chloride (10.65 g., 0.0895 mole) is added slowly with stirring and heating. The mixture is then heated for one additional hour and the benzene and excess thionyl chloride is removed by distillation at reduced pressure. The residue is taken up in dry ether and added dropwise under anhydrous conditions with stirring to a boiling mixture of 2-dimethylaminoethanol (7.12 g., 0.08 mole) and anhydrous potassium carbonate (15.5 g., 0.112 mole) in boiling dry ether. When most of the acid chloride has been added a large gummy lump forms which makes further stirring impossible. The mixture is heated for an additional two hours without stirring; it is then cooled and water is added to dissolve the inorganic salts. The ether layer is separated, dried over sodium sulfate and then acidified with alcoholic hydrogen chloride to separate an oil. A sample of the oil is dissolved in acetone and dry ether is then added whereupon a solid separates. On adding the solid sample to the remaining oily product, it solidifies at once. The product is crystallized twice from acetone to obtain 10.4 g. of 2-dimethylaminoethyl [3-chloro-4 - (2-methylenebutyryl)phenoxy]-acetate hydrochloride, M.P. 121–123° C.

Analysis for $C_{17}H_{24}ClNO_4 \cdot HCl$—Calculated: C, 53.97; H, 6.66; N, 3.70. Found: C, 54.43; H, 6.29; N, 3.67.

EXAMPLE 2

Phenacyl [2,3-dichloro-4-(2-methylenebutyryl) phenoxy]-acetate

Step A: (2,3-dichloro-4-butyrylphenoxy)acetic acid.—The above product is prepared employing substantially the same technique and apparatus described in Example 1, Step A, using the following reactants:

(2,3-dichlorophenoxy)-acetic acid ____ 22.1 g., 0.1 mole.
n-Butyryl chloride _____ 21.3 g., 0.2 mole.
Powered aluminum chloride _____ 53.3 g., 0.4 mole.

The (2,3-dichlorophenoxy)acetic acid and n-butyryl chloride are placed in the reaction vessel and stirred while the aluminum chloride is added portionwise over a 45-minute period. The mixture then is heated on a steam bath for three hours, and allowed to cool to room temperature. The gummy product obtained is added to a mixture of 300 g. of crushed ice and 30 ml. concentrated hydrochloric acid. The resulting mixture is extracted with ether and the extract evaporated at reduced pressure. The residue is suspended in boiling water and dissolved by addition of a minimum quantity of 40% sodium hydroxide. After treatment with decolorizing charcoal and filtering, the hot filtrate is made acid to Congo red paper and chilled in ice. The oil that separates is extracted with ether, the extract dried over anhydrous sodium sulfate and then evaporated at reduced pressure. The residue is dissolved in boiling benzene (75 ml.), treated with decolorizing charcoal, filtered, treated with boiling cyclohexane (275 ml.) and cooled to give 22.3 g. of (2,3-dichloro-4-butyrylphenoxy)acetic acid. After several recrystallizations from a mixture of benzene and cyclohexane, then from methylcyclohexane, next from a mixture of acetic acid and water and finally from methylcyclohexane, the product melts at 110–111° C. (Corr.).

Analysis for $C_{12}H_{12}Cl_2O_4$.—Calculated: C, 49.51; H, 4.15; Cl, 24.36. Found: C, 49.81; H, 4.22; Cl, 24.40.

Step B: [2,3 - dichloro - 4-[2 - (dimethylaminomethyl) butyryl]phenoxy]acetic acid hydrochloride.—In a 100 ml. round flask equipped with an outlet tube suitable for conecting to a water aspirator is placed an intimate mixture of (2,3-dichloro-4-butyrylphenoxy)acetic acid (5.20 g., 0.0179 mole), paraformaldehyde (0.63 g., 0.072 mole), dry dimethylamine hydrochloride (1.59 g., 0.0195 mole) and 4 drops acetic acid. The mixture is heated on the steam bath for about 1.5 hours and during this period the internal pressure of the vessel is reduced to about 15 mm. mercury for a period of one minute at 15-minute intervals. Upon cooling, a solid is obtained which is triturated with ether to give 5.8 g. (85%) of [2,3-dichloro - 4 - [2-(dimethylaminomethyl)butyryl]phenoxy]acetic acid hydrochloride in the form of a white solid. After two recrystallizations carried out by dissolving the solid in hot methanol and gradually adding ether, the product melts at 165–167° C.

Analysis for $C_{15}H_{20}Cl_3NO_4$.—Calculated: C, 46.83; H, 5.24; Cl, 27.65; N, 3.64. Found: C, 46.69; H, 5.31; Cl, 27.59; N, 3.53.

Step C: [2,3 - dichloro-4 - (2-methylenebutyryl)-phenoxy]acetic acid. The [2,3 - dichloro - 4 - [2-(dimethylaminomethyl)-butyryl]phenoxy]acetic acid hydrochloride, obtained as described above, is treated with aqueous sodium bicarbonate by substantially the same method described in Example 1, Step C, to give [2,3-dichloro-4-(2-methylenebutyryl)phenoxy]acetic acid, M.P. 115–118° C. Two recrystallizations from a mixture of benzene and cyclohexane give [2,3-dichloro-4 - (2-methylenebutyryl) phenoxy]acetic acid in the form of a white solid material melting at 118.5–120.5° C.

Analysis for $C_{13}H_{12}Cl_2O_4$.—Calculated: C, 51.51; H, 3.99; Cl, 23.39. Found: C, 51.23; H, 4.18; Cl, 23.49.

Step D: phenacyl [2,3-dichloro-4-(2-methylenebutyryl) phenoxy]acetate.—To a solution of sodium hydroxide (0.80 g., 0.02 mole) in water (75 ml.), is added [2,3-dichloro - 4 - (2-methylenebutyryl)phenoxy]acetic acid (6.67 g., 0.022 mole) and ethanol (10 ml.). A solution of phenacyl bromide (3.98 g., 0.02 mole) in ethanol (125 ml.) is added and the resulting solution is heated under reflux for 1.5 hours.

The reaction mixture is chilled in ice water and the white solid which separates is collected and dried. A yield of 6.87 g. (82%) of phenacyl [2,3-dichloro-4-(2-methylenebutyryl)phenoxy]acetate is thus obtained, M.P. 114–116° C. Two recrystallizations from ethanol give white needles, M.P. 117–118° C.

Analysis for $C_{21}H_{18}Cl_2O_5$—Calculated: C, 59.87; H, 4.31; Cl, 16.83. Found: C, 59.97; H, 4.56; Cl, 16.75.

EXAMPLE 3

2-diethylaminoethyl[2,3-dichloro-4-(2-methylenebutyryl) phenoxy]acetate hydrochloride Step A: [2,3-dichloro-4-(2-methylenebutyryl)phenoxy] acetyl chloride.—A mixture of [2,3-dichloro-4-(-2-methylene butyryl)phenoxy]acetic acid (18.19 g., 0.06 mole), thionyl chloride (14.18 g., 0.12 mole) and benzene (45 ml.) is heated under reflux for 1¼ hours. The volatile materials are removed under reduced pressure. The residue is dissolved in benzene and then evaporated under reduced pressure. This procedure of dissolving the residue in benzene and then evaporating under reduced pressure is repeated a second time to aid in the removal of remaining traces of thionyl chloride. The oily residue thus obtained is [2,3 - dichloro-4-(2-methylenebutyryl)phenoxy]acetyl chloride, which is used directly in the following step without further purification.

Step B: 2-diethylaminoethyl [2,3-dichloro-4-(2-methylenebutyryl)phenoxy]acetate hydrochloride.—To a boiling mixture of 2-diethylaminoethanol (7.73 g., 0.066 mole), potassium carbonate (16.58 g., 0.12 mole) and ether (200 ml.) is added a solution of [2,3-dichloro-4-(2-methylenebutyryl)phenoxy]acetyl chloride in ether (50 ml.), dropwise over a peroid of one hour. After addition is complete, the reaction mixture is refluxed with stirring for three hours.

The reaction mixture is treated with water (250 ml.) to dissolve the solid and the ether layer is separated. The ether solution is then dried over anhydrous magnesium sulfate, filtered and the filtrate treated dropwise with a solution of hydrogen chloride in anhydrous ethanol until precipitation appears complete. There is obtained 25.1 g. (95%) of white solid, M.P. 136–140° C. Two recrystallizations from isopropyl alcohol give 2-diethylaminoethyl [2,3-dichloro-4-(2-methylenebutyryl)phenoxy]acetate hydrochloride, M.P. 138–140° C.

Analysis for $C_{19}H_{25}Cl_2NO_4 \cdot HCl$.—Calculated: C, 52.01; H, 5.97; N, 3.19. Found: C, 52.17; H, 6.14; N, 3.10.

EXAMPLE 4

Phenyl [2,3-dichloro-4-(2-methylenebutyryl)phenoxy] acetate

Step A: [2,3-dichloro-4-(2-methylenebutyryl)phenoxy] acetyl chloride.—The procedure described in Example 3, Step A, is employed, using the following compounds:

[2,3-dichloro-4-(2-methylenebutyryl)phenoxy]acetic acid _____ 6.06 g. (0.02 mole).
Thionyl chloride _____ 4.76 g. (0.04 mole).
Benzene _____ 15 ml.

There is thus obtained [2,3-dichloro-4-(2-methylenebutyryl)phenoxy]acetyl chloride, which is used directly in the next step.

Step B: phenyl [2,3-dichloro-4-(2-methylenebutyryl) phenoxy]acetate.—A solution of phenol (3.76 g., 0.04 mole) in pyridine (25 ml.) is chilled in a salt-ice bath to 0° C. and treated with a solution of the [2,3-dichloro-4-(2-methylenebutyryl)phenoxy]acetyl chloride of Step A in benzene (10 ml.). The addition requires 30 minutes and the temperature is maintained at 0° C. The cooling bath is removed and stirring is continued for 30 minutes.

The reaction mixture is poured into cold water and the oily layer is extracted with ether. The combined ether extracts are washed with water, one normal hydrochloric acid, water, 8% sodium bicarbonate solution and finally again with water. The ether solution is dried over anhydrous magnesium sulfate and then the ether is removed under reduced pressure to give an oily residue. The residue is fractionally distilled to give 5.50 g. (72%) of a viscous liquid identified as phenyl [2,3-dichloro-4-(2-methylenebutyryl)phenoxy]acetate, B.P. 230–232° C./0.1 mm.

Analysis for $C_{19}H_{16}Cl_2O_4$.—Calculated: C, 60.17; H, 4.25; Cl, 18.70. Found: C, 59.94; H, 4.28; Cl, 18.48.

EXAMPLE 5

Phenyl (3-methacryloylphenoxy)acetate

Step A: (3-propionylphenoxy)acetic acid.—A solution of 0.1 mole of 3-propionylphenol in 60 cc. of ethylene glycol dimethyl ether is added to a suspension of 0.1 mole of sodium hydride in 40 cc. of the same solvent. Ethyl bromoacetate (0.11 mole) is then added during 25 minutes and the resulting mixture is refluxed one hour. Precipitated sodium bromide is then filtered off and the solvent is distilled in vacuo. To the residue is added 80 cc. of 10% sodium hydroxide solution and the mixture is heated on the steam bath for 10 minutes until a clear solution is formed. The solution is acidified to precipitate the produce which soon crystallizes. Recrystallization from a mixture of benzene and cyclohexane gives (3-propionylphenoxy) acetic acid, M.P. 72–78° C.

Step B: [3 - [2-(dimethylaminomethyl)propionyl]-phenoxy]acetic acid hydrochloride.—A mixture of (3-propionylphenoxy)acetic acid (17.0 g., 0.082 mole), paraformaldehyde (3.2 g., 0.105 mole), dimethylamine hydrochloride (7.4 g., 0.9 mole) and 0.8 cc. of acetic acid is heated 1.7 hours on the steam bath. The crystalline mass thus obtained is triturated with 120 cc. boiling isopropyl alcohol. The insoluble [3-[2-(dimethylaminomethyl)propionyl]phenoxy]acetic acid hydrochloride thus obtained weighs 18.0 g., M.P. 148–152° C.

Step C: (3-methacryloylphenoxy)acetic acid.—A solution of 14.0 g. of [3-[2-(dimethylaminomethyl)propionyl]phenoxy]acetic acid hydrochloride in 120 cc. of saturated sodium bicarbonate solution is heated three minutes on the steam bath. Acidification with hydrochloric acid precipitates the crystalline unsaturated ketone which, after recrystallization from a mixture of benzene and cyclohexane, gives 2.8 g. of (3-methacryloylphenoxy)acetic acid, M.P. 69–71° C.

Analysis for $C_{12}H_{12}O_4$.—Calculated: C, 65.44; H, 5.49. Found: C, 65.43; H, 5.79.

Step D: (3-methacryloylphenoxy)acetyl chloride.—The procedure described in Example 3, Step A, is employed, substituting (3-methacryloylphenoxy)acetic acid for the [2,3-dichloro-4-(2-methylenebutyryl)phenoxy]acetic acid described therein. There is thus obtained (3-methacryloylphenoxy)acetyl chloride, which is used directly in the next step.

Step E: Phenyl (3-methacryloylphenoxy)acetate.—By substituting the (3-methacryloylphenoxy)acetyl chloride of Step D for the [2,3-dichloro-4-(2-methylenebutyryl)phenoxy]acetyl chloride of Example 4, Step B, and following substantially the procedure described therein, the product phenyl (3-methacryloylphenoxy)acetate is obtained.

EXAMPLE 6

2-dimethylaminoethyl [2-(2-methylenebutyryl)-3,5-dimethylphenoxy]acetate hydrochloride Step A: 2-butyryl-3,5-dimethylphenol.—To a solution of 0.15 mole of 3,5-dimethylphenol in 60 cc. of pyridine is added, during 15 minutes, 0.18 mole of butyryl chloride with ice bath cooling. The mixture is permitted to stand one hour at room temperature and then diluted with 300 cc. of water to give an oily product which is taken up in ether. The ether solution is washed thoroughly with dilute acid and water, dried, and the ether evaporated to give the butyric acid ester of 3,5-dimethylphenol. The ester is mixed with 0.29 mole of aluminum chloride and then heated 1.6 hours on the steam bath. The reaction mixture is poured onto ice and the solid product obtained is recrystallized from cyclohexane to give 2-butyryl-3,5-dimethylphenol, M.P. 57–58.5° C.

Analysis for $C_{12}H_{16}O_2$.—Calculated: C, 74.97; H, 8.39. Found: C, 74.63; H, 8.35.

Step B: (2-butyryl-3,5-dimethylphenoxy)acetic acid.—By substituting 2-butyryl-3,5-dimethylphenol for the 3-propionylphenol of Example 5, Step A, and following substantially the procedure described therein, the compound (2-butyryl-3,5-dimethylphenoxy)acetic acid is obtained which, after recrystallization from aqueous acetic acid, melts at 108–109° C.

Step C: [2-[2-(dimethylaminomethyl)butyryl]-3,5-dimethylphenoxy]acetic acid hydrochloride.—By substituting the (2-butyryl-3,5-dimethylphenoxy)acetic acid obtained in Step B for the (3-chloro-4-butyrylphenoxy)acetic acid of Example 1, Step B, and following substantially the procedure described therein, the compound [2-[2-(dimethylaminomethyl)butyryl]-3,5-dimethylphenoxy]acetic acid hydrochloride is obtained, M.P. 165–167° C.

Step D: [2-(2-methylenebutyryl)-3,5-dimethylphenoxy]acetic acid.—By substituting [2-[2-(dimethylaminomethyl)butyryl]-3,5-dimethylphenoxy]acetic acid hydrochloride for the [3-chloro-4-[2-(dimethylaminomethyl)butyryl]phenoxy]acetic acid hydrochloride of Example 1, Step C, and following substantially the procedure described therein, the compound [2-(2-methylenebutyryl)-3,5-dimethylphenoxy]acetic acid is obtained which, after recrystallization from aqueous acetic acid, melts at 109.5–111° C.

Analysis for $C_{15}H_{18}O_4$.—Calculated: C, 68.68; H, 6.92. Found: C, 68.68; H, 7.04.

Step E: 2-dimethylaminoethyl [2-(2-methylenebutyryl)-3,5-dimethylphenoxy]acetate hydrochloride.—By substituting [2-(2-methylenebutyryl)-3,5-dimethylphenoxy]acetic acid for the [3-chloro-4-(2-methylenebutyryl)phenoxy]acetic acid of Example 1, Step D, and following substantially the procedure described therein, the product 2-dimethylaminoethyl [2-(2-methylenebutyryl)-3,5-dimethylphenoxy]acetate hydrochloride is obtained.

In a manner similar to that described in Example 1, Steps A and B, all of the products embraced by the general Formula Ib, infra, may be prepared. Thus, by substituting the appropriate alkanoyl halide (VIII) and phenoxy-alkanoic acid (IX) for the corresponding n-butyryl chloride and (3-chlorophenoxy)acetic acid reactants of Example 1, Step A, and following substantially the procedure described in Steps A–D of that example, all of the products set forth in Table I, infra, may be obtained. The equations which follow, wherein the letter $x$ represents the integer 1 or a number greater than 1, illustrate the reaction of Example 1, Steps A–D and, together with Table I, describes the reactants employed therein:

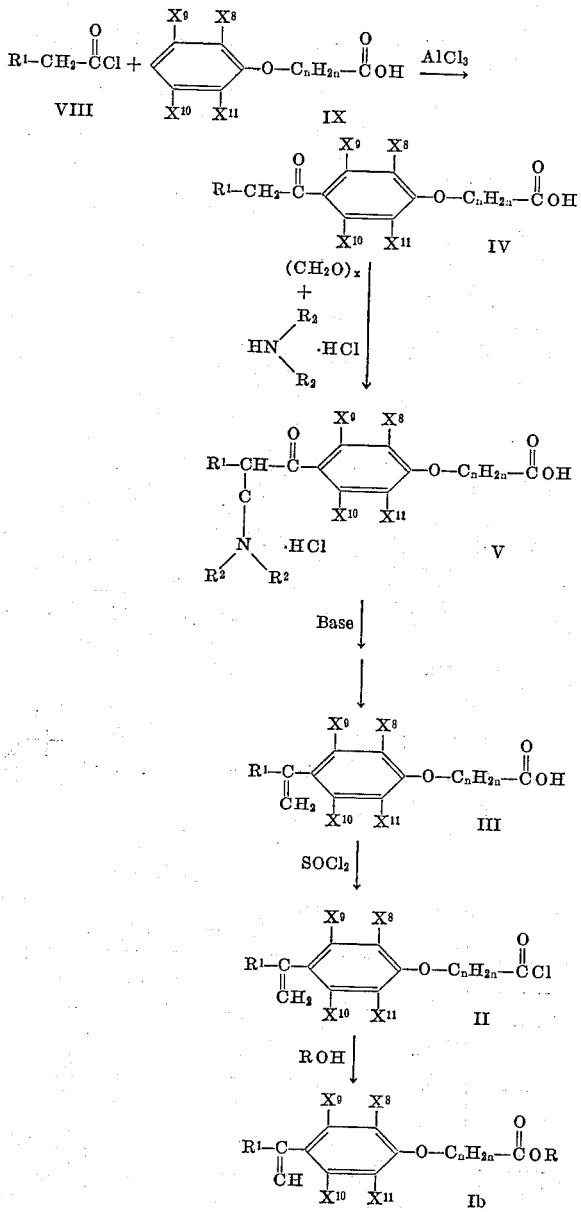

TABLE I

| Ex. | R | R₁ | $-C_nH_{2n}-$ | $X^8$ | $X^9$ | $X^{10}$ | $X^{11}$ |
|---|---|---|---|---|---|---|---|
| 7 | —C₆H₄—CH₃ | —C₂H₅ | —CH₂— | —CH₃ | —CH₃ | H | H |
| 8 | —CH₂—(CH₂)₂—N(CH₃)₂·HCl | —C₂H₅ | —CH₂— | H | —CH₃ | H | H |
| 9 | —C₆H₃(CH₃)₂ | —C₂H₅ | —CH₂— | —CH₃ | —CH₃ | —CH₃ | —CH₃ |
| 10 | —CH₂—(CH₂)₃—N(CH₃)₂·HCl | —CH₂—CF₃ | —CH₂— | —CH₃ | —CH₃ | H | H |
| 11 | —C₆H₄—C₂H₅ | —CH₃ | —(CH₂)₂— | H | Cl | H | H |
| 12 | —CH₂—CH₂—N(C₃H₇)₂·HCl | —C₂H₅ | —CH₂— | H | Br | H | H |
| 13 | —CH₂—CH₂—N(C₂H₅)₂·HCl | —C₂H₅ | —CH₂— | Cl | —CH₃ | H | H |
| 14 | —C₆H₄—C₃H₇ | —CH₃ | —CH₂— | H | Cl | H | H |
| 15 | —CH₂—CH₂—N(C₂H₅)₂·HCl | —(CH₂)₄—CH₃ | —CH₂— | H | Cl | H | H |
| 16 | —C₆H₅ | —C₂H₅ | —CH₂— | —CH—CH₃<br>\|<br>CH₃ | H | —CH₃ | H |

Similarly, by substituting the appropriate reactants for those described in Example 2, the compounds depicted by general Formula Ic, infra, may be prepared. Thus, by replacing the n-butyryl chloride and (2,3-dichlorophenoxy)-acetic acid starting materials of Example 2, Step A, with other, appropriate, alkanoyl halide (VIII, supra) and phenoxy-alkanoic acid (IX, supra) reactants and following substantially the procedure described in Steps A–C of that example, the corresponding [(2-methylenealkanoyl)-phenoxy]-alkanoic acids (III, supra) may be obtained. When the [(2-methylenealkanoyl)phenoxy]-alkanoic acids (III) thus obtained and a suitable mononuclear aryl-carbonyl bromide are then substituted for the phenacyl bromide and [2,3-dichloro-4-(2-methylenebutyryl)phenoxy]acetic acid of Example 2, Step D, and the procedure of that example and step are followed, the corresponding mononuclear aryl-carbonyl-methyl [(2-methylenealkanoyl)phenoxy]-alkanoates are obtained. The equation which follows illustrates the reaction of Example 2, Step D, and, together with Table II, also describes the reactants employed therein:

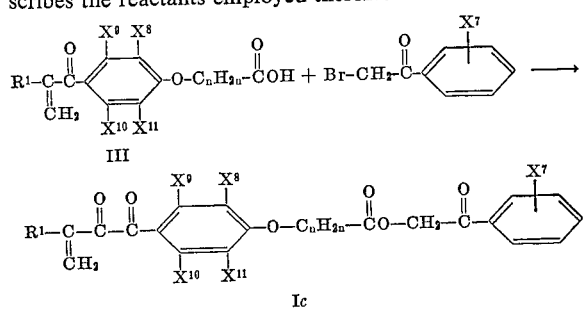

It will be apparent from the foregoing description that the [(2-methylenealkanoyl)phenoxy]-alkanoic acid esters of this invention constitute a valuable class of compounds which have not been prepared heretofore. One skilled in the art will also appreciate that the processes disclosed in the above examples are merely illustrative and are capable of wide variation and modification without departing from the spirit of this invention.

This application is a continuation-in-part of our copending patent application Serial No. 155,961, filed December 6, 1961.

What is claimed is:

1. A compound of the formula:

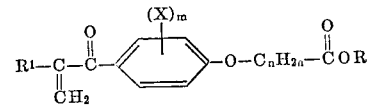

wherein R is a member selected from the group consisting of mononuclear aryl-carbonyl-methyl and mononuclear aryl; R¹ is a member selected from the group consisting of lower alkyl and trifluoromethyl substituted lower alkyl; X is a member selected from the group consisting of hydrogen, halogen and lower alkyl; $m$ is an integer having a value of 1–4; and $n$ is an integer having a value of 1–4.

2. The mononuclear aryl-carbonyl-methyl ester of [3-halo-4-(2-methylenealkanoyl)phenoxy]-alkanoic acid.

3. The mononuclear aryl ester of [3-halo-4-(2-methylenealkanoyl)phenoxy]-alkanoic acid.

4. The mononuclear aryl-carbonyl-methyl ester of [3-halo-4-(2-methylene-trifluoromethyl substituted alkanoyl)phenoxy]-alkanoic acid.

TABLE II

| Example | R¹ | $-C_nH_{2n}-$ | $X^8$ | $X^9$ | $X^{10}$ | $X^{11}$ | $X^7$ |
|---|---|---|---|---|---|---|---|
| 17 | —C₂H₅ | —CH₂— | —CH₃ | Cl | H | H | 4-CH₃ |
| 18 | —CH—CF₃<br>\|<br>CH₃ | —CH₂— | H | —CH₃ | H | H | 4-C₂H₅ |
| 19 | —C₂H₅ | —CH—<br>\|<br>CH₃ | H | Cl | H | H | 4-Cl |
| 20 | —(CH₂)₃—CH₃ | —CH₂— | H | Cl | H | H | H |
| 21 | —C₂H₅ | —CH₂— | H | Cl | Cl | H | 3-Cl |
| 22 | —CH₂(CH₃) | —CH₂— | H | Cl | H | H | H |

5. The mononuclear aryl ester of [3-halo-4-(2-methylene-trifluoromethyl substituted alkanoyl)phenoxy]-alkanoic acid.

6. The mononuclear aryl-carbonyl-methyl ester of [2,3-dihalo-4-(2-methylenealkanoyl)phenoxy]-alkanoic acid.

7. The mononuclear aryl ester of [2,3-dihalo-4-(2-methylenealkanoyl)phenoxy]-alkanoic acid.

8. The mononuclear aryl-carbonyl-methyl ester of [2,3-dihalo-4-(2-methylene-trifluoromethyl substituted alkanoyl)phenoxy]-alkanoic acid.

9. The mononuclear aryl ester of [2,3-dihalo-4-(2-methylene-trifluoromethyl substituted alkanoyl)-phenoxy]-alkanoic acid.

10. Phenacyl [2,3-dichloro-4-(2-methylenebutyryl)phenoxy]acetate.

11. Phenyl [2,3 - dichloro-4-(2-methylenebutyryl)phenoxy]acetate.

12. Phenyl (3-methacryloylphenoxy)acetate.

References Cited

UNITED STATES PATENTS 2,523,188  9/1950  Britton et al. _____ 260—473

RICHARD K. JACKSON, *Primary Examiner.*

S. WILLIAMS, *Assistant Examiner.*